(12) United States Patent
Cottereau et al.

(10) Patent No.: US 10,393,588 B2
(45) Date of Patent: Aug. 27, 2019

(54) INFRARED DETECTION MODULE AND ASSOCIATED INFRARED VIEWING DEVICE

(71) Applicant: Safran Electronics & Defense, Boulogne-Billancourt (FR)

(72) Inventors: Bertrand Cottereau, Boulogne-Billancourt (FR); Michel Bidaud, Boulogne-Billancourt (FR); Nicolas Duval, Boulogne-Billancourt (FR); Philippe Legoubin, Boulogne-Billancourt (FR); Philippe Rassinoux, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 13 days.

(21) Appl. No.: 15/311,161

(22) PCT Filed: May 15, 2015

(86) PCT No.: PCT/EP2015/060783
§ 371 (c)(1),
(2) Date: Nov. 14, 2016

(87) PCT Pub. No.: WO2015/173407
PCT Pub. Date: Nov. 19, 2015

(65) Prior Publication Data
US 2017/0097265 A1  Apr. 6, 2017

(30) Foreign Application Priority Data

May 15, 2014  (FR) .................................... 14 54333

(51) Int. Cl.
*G01J 5/06* (2006.01)
*G01J 5/04* (2006.01)
*F25D 19/00* (2006.01)

(52) U.S. Cl.
CPC .............. *G01J 5/061* (2013.01); *F25D 19/00* (2013.01); *G01J 5/04* (2013.01); *G01J 5/045* (2013.01)

(58) Field of Classification Search
CPC .................................... G01J 5/061; G01J 5/04
(Continued)

(56) References Cited

U.S. PATENT DOCUMENTS 3,064,128 A   11/1962 Duke
3,079,504 A   2/1963 Hutchens
(Continued)

FOREIGN PATENT DOCUMENTS

DE   37 42 272 A1   6/1989
JP   2001 183021 A   6/2001
WO   WO 2013/061327 A2   5/2013

OTHER PUBLICATIONS

Search Report in French Application No. 1454333 dated Jan. 29, 2015, with English translation coversheet. 3 pages.
(Continued)

*Primary Examiner* — David P Porta
*Assistant Examiner* — Gisselle Gutierrez
(74) *Attorney, Agent, or Firm* — Womble Bond Dickinson (US) LLP (57) ABSTRACT

The invention relates to an infrared detection module (4) comprising: a detection portion (7) comprising an infrared detector (16) and a detector housing (11) suitable for containing the infrared detector; a cold-production portion (8) comprising a refrigerating machine (39) for cooling the detector (16) and a refrigerating-machine casing (12) suitable for containing the refrigerating machine (39); and an attachment device (56) for attaching the detector casing (11) to the refrigerating-machine casing (12), the attachment device (56) comprising a nut (57) suitable for being screwed
(Continued)

onto the detector housing (11) and/or onto the refrigerating-machine casing (12) so as to rigidly connect the casings to one another.

14 Claims, 7 Drawing Sheets

(58) Field of Classification Search
USPC .......................................................... 250/332
See application file for complete search history.

(56) References Cited

U.S. PATENT DOCUMENTS

| | | | | |
|---|---|---|---|---|
| 4,674,179 | A * | 6/1987 | Gugel | ........................ B41J 2/28 |
| | | | | 29/418 |
| 2007/0017679 | A1* | 1/2007 | Wolf | ..................... E21B 23/006 |
| | | | | 166/312 |
| 2010/0059032 | A1* | 3/2010 | Zadra | ...................... F41A 11/02 |
| | | | | 124/63 |
| 2010/0265986 | A1 | 10/2010 | Mullin et al. | |

OTHER PUBLICATIONS

International Search Report in PCT/EP2015/060783 dated Aug. 31, 2015, with English translation. 6 pages.

\* cited by examiner

FIG. 1

FIG. 2
State of the art

FIG. 3
State of the art

INFRARED DETECTION MODULE AND ASSOCIATED INFRARED VIEWING DEVICE

FIELD OF THE INVENTION

The invention relates to an infrared detection module, and infrared vision equipment incorporating such a module.

PRIOR ART

Infrared vision equipment, such as binoculars for example, are known to visualize targets at night or through fumes.

Figure 1:
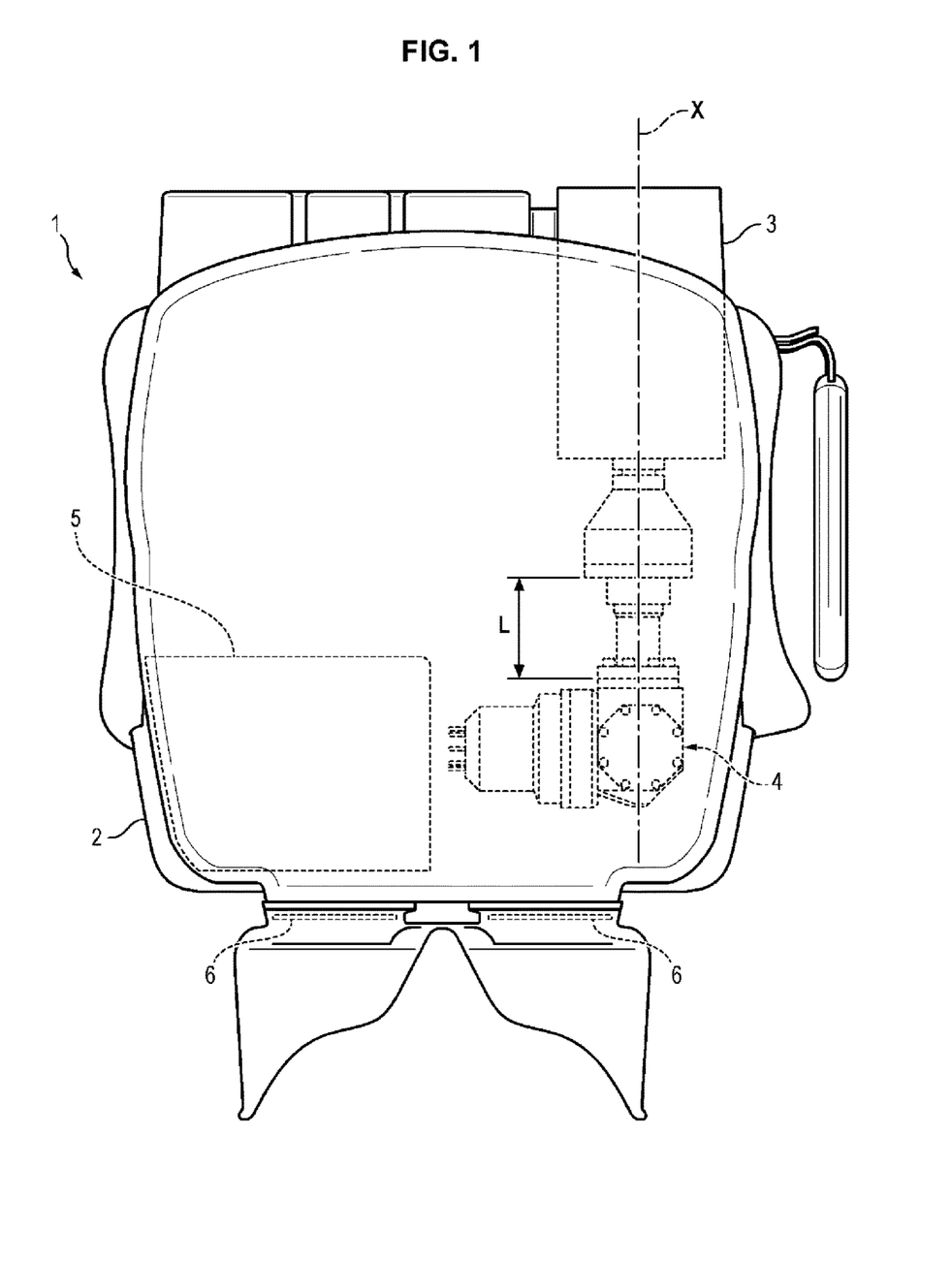
FIG. 1 schematically illustrates infrared vision equipment.

FIG. 1 schematically illustrates infrared vision binoculars 1. The binoculars 1 comprise a case 2, an optical system 3, an infrared detection module 4, a processing module 5 and two display screens 6. The optical system 3 is arranged to transmit infrared radiation emitted by the target to the detection module 4. The detection module 4 converts the infrared radiation received into a detection signal which is transmitted to the processing module 5. The processing module 5 orders display of an image on the display screens 6 to let a user visualize the target. For this purpose the user positions his eyes in front of the display screens 6.

Figure 2:
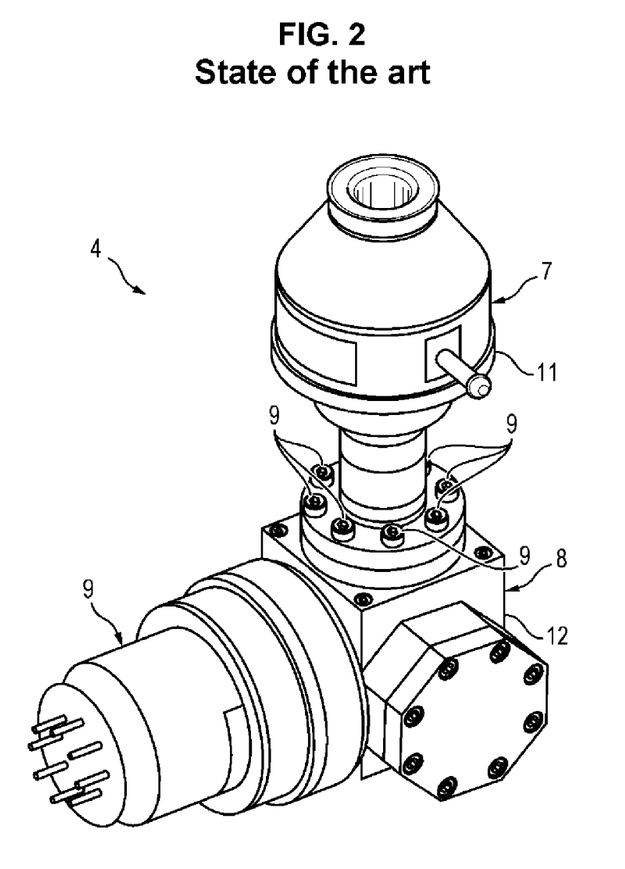
FIG. 2 schematically illustrates a detection module in accordance with the prior art.

FIG. 2 schematically illustrates an infrared detection module 4. The infrared detection module 4 comprises a detection part 7, a cold-production part 8 and a motorisation part 9. The detection part 7 comprises an infrared detector, such as a matrix infrared detector or FPA (not shown in this figure). The cold-production part 8 comprises a cooling machine (not shown in this figure) ensuring cooling of the infrared detector, at a temperature typically of the order of 80 degrees Kelvin.

The detection part 7 comprises a detector housing 11 for accommodating the infrared detector, and the cold-production part 8 comprises a cooling machine housing 12 for accommodating the cooling machine. During assembly of the detection part 7 and of the cold-production part 8, the detector housing is generally screwed onto the cooling machine housing by means of several fastening screws 9. Screwing must be done with considerable tightening torque (of the order of 2 Newton·meter) to ensure sealing of the cooling machine housing. In fact, the cooling machine housing contains cooling gas subjected to strong pressure (typically 20 bars) during operation of the cooling machine.

Figure 3:
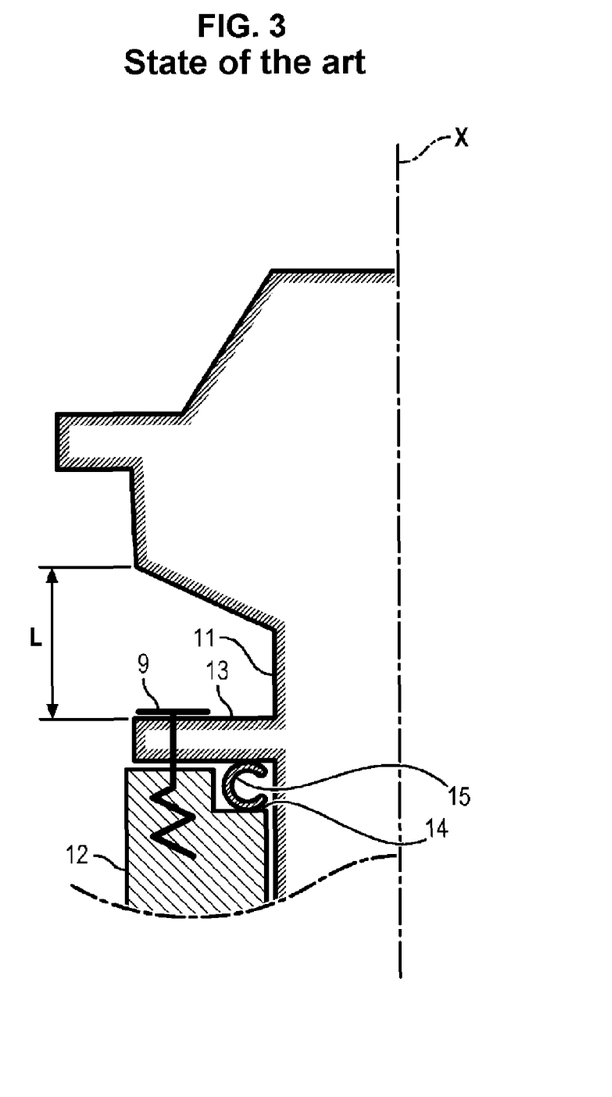
FIG. 3 is a principle diagram illustrating fastening of the detector housing on the cooling machine housing in a detection module in accordance with the prior art, FIG. 4 schematically illustrates a detection module in accordance with a first embodiment of the invention, FIG. 5 schematically illustrates fastening of the detector housing on the cooling machine housing in a detection module in accordance with the first embodiment of the invention, FIGS. 6a and 6b schematically illustrate fastening of the detector housing on the cooling machine housing in a detection module in accordance with a second embodiment of the invention, FIGS. 7a and 7b schematically illustrate fastening of the detector housing on the cooling machine housing in a detection module in accordance with a third embodiment of the invention.

FIG. 3 schematically illustrates the fastening principle of the detector housing 11 on the cooling machine housing 12. The detector housing 11 comprises a crown 13 for bearing against the cooling machine housing 12. Also, the cooling machine housing 12 has a shoulder 14 supporting a sealing joint 15. The crown 13 of the detector housing 11 is screwed onto the cooling machine housing 12 so as to bear on the cooling machine housing 12 by means of the sealing joint 15.

But, because of development of new generations of infrared detectors, which operate at higher temperatures (of the order of 150 degrees Kelvin), it has become possible to reduce the dimensions of the detection part 7, and in particular reduce the length L of the detector housing 11 in which the heat exchanger of the cooling machine is inserted. In fact, raising the operating temperature of the detectors uses cooling machines including smaller-sized heat exchangers.

Reduction of dimensions of the heat exchanger leads to reduction in bulk of the infrared detection module along to the direction of the optical axis X, and the advantage is to enable design of more and more compact binoculars.

But, a consequence of the reduction in bulk of the detection module also is to make access to the fastening screws 9 difficult, especially by means of a wrench.

SUMMARY OF THE INVENTION

An aim of the invention is to facilitate assembly of the detector housing on the housing of the cooling machine, in a detection module of reduced size.

This aim is achieved in terms of the present invention by an infrared detection module comprising:
 a detection part comprising an infrared detector and a detector housing for accommodating the infrared detector,
 a cold-production part comprising a cooling machine for cooling the detector and a cooling machine housing for accommodating the cooling machine, and
 a fastening device for fixing the detector housing onto the cooling machine housing, the fastening device comprising a nut for being screwed onto the detector housing and/or on the cooling machine housing so as to secure the housings together.

The use of a nut for fastening the housings together eliminates fastening screws, and facilitates for screwing operations.

The detection module can further be designed so that fastening of housings is achieved by means of a single nut. In this way, fastening requires only a single screwing operation.

The detection module can further have the following characteristics:
 the detector housing comprises a cold finger having an elongated cylindrical part intended to contain a heat exchanger of the cooling machine,
 the module comprises a sealing joint arranged between the detector housing and the cooling machine housing, and in which the effect of screwing of the nut is to compress the sealing joint between the detector housing and the cooling machine housing,
 the sealing joint is a joint having a transversal C-shaped cross-section,
 the nut comprises a washer for bearing against a support surface of the detector housing, and a threaded inner surface for cooperating with a threaded outer surface of the cooling machine housing, the effect of screwing the nut onto the cooling machine housing being to clamp the detector housing against the cooling machine housing by means of the washer,
 the detector housing comprises a crown, the support surface being a surface of the crown,
 the detector housing comprises a groove and an elastic ring received in the groove, the support surface being a surface of the elastic ring,
 the nut comprises a inner surface having a first threaded portion for cooperating with a threaded outer surface of the detector housing and a second threaded portion for cooperating with a threaded outer surface of the cooling machine housing,
 the first threaded portion has a first pitch and the second threaded portion has a second pitch, reversed relative to the first pitch,
 the module comprises an indexing pin fixed to one of the housings and an indexing orifice arranged in the other housing, the indexing orifice being provided to receive the indexing pin so as to keep the housings in position relative to each other during screwing of the nut, the nut encloses the detector housing and/or the cooling machine housing, the detector housing comprises a first part defining a cavity accommodating the infrared detector, and a second part for being inserted in the cooling machine housing, and wherein the nut has been mounted on the second part prior to welding of the first part onto the second part, such that once the two parts are welded, the nut is inseparable from the detector housing, the detector has an optical axis, and the nut is for being screwed onto the detector housing and/or onto the cooling machine housing around a screwing axis combined with the optical axis.

The invention also relates to infrared vision equipment comprising a detection module such as defined previously.

The equipment can in particular be binoculars.

PRESENTATION OF THE DRAWINGS

Other characteristics and advantages will emerge from the following description which is purely illustrative and non-limiting and must be considered in conjunction with the appended drawings, in which.

DETAILED DESCRIPTION OF AN EMBODIMENT

Figure 4:
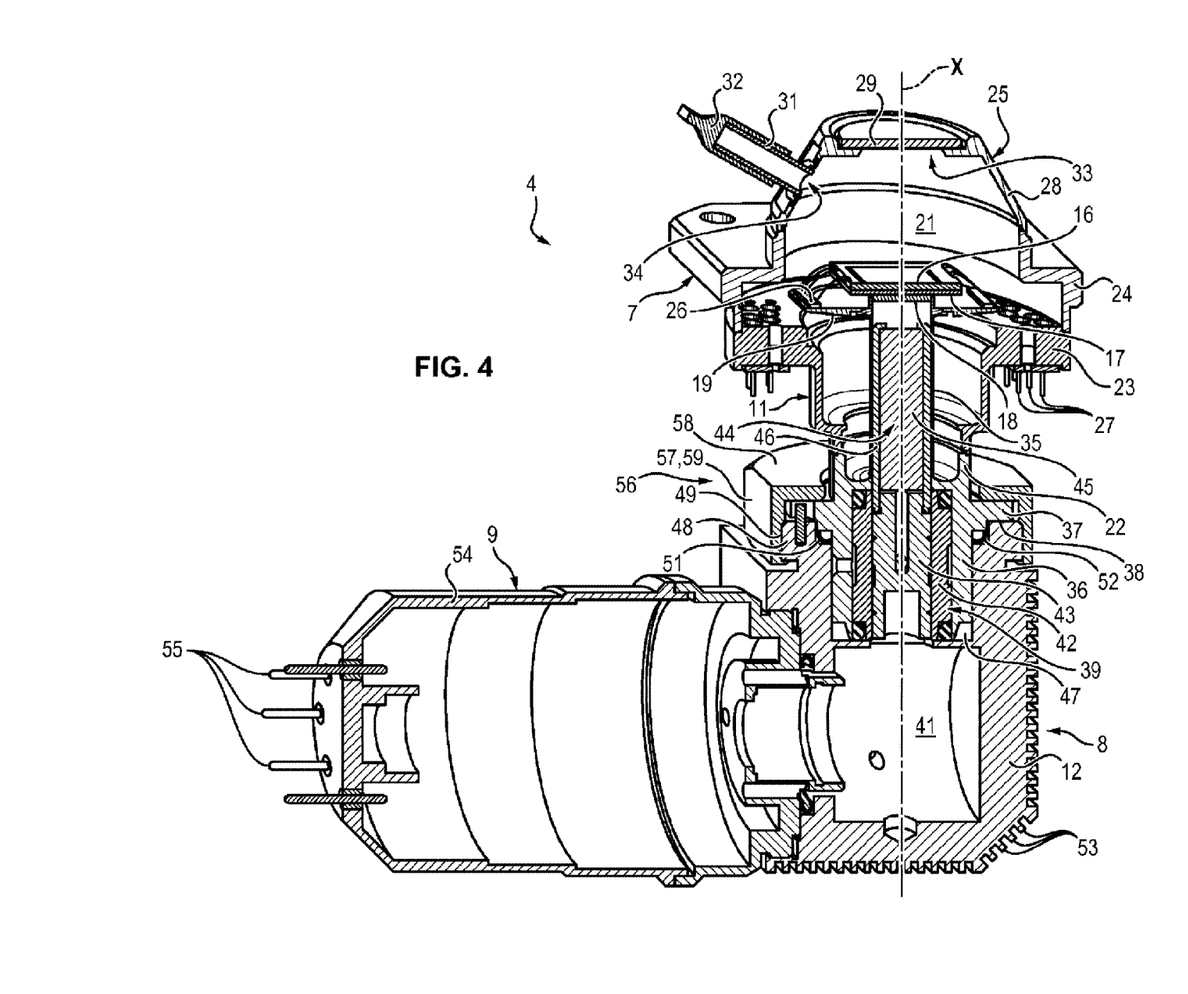
Figure 5:
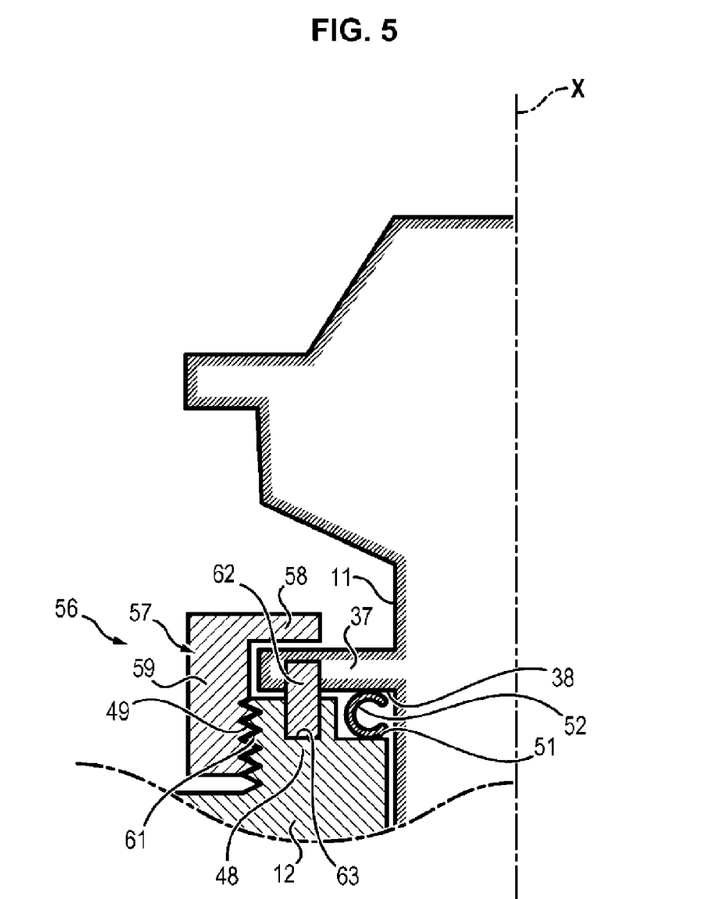

According to a first embodiment illustrated in FIGS. 4 and 5, the detection module 4 comprises a detection part 7, a cold-production part 8 and a motorisation part 9.

The detection part 7 comprises a matrix infrared detector 16, a substrate 17 supporting the detector, a plug 18 in contact with the substrate and an intermediate cup 19 for supporting a cold screen (not shown).

The detection part 7 also comprises a detector housing defining a first cavity 21 (or detection chamber) accommodating the infrared matrix detector 16, the substrate 17, the plug 18 and the intermediate cup 19.

The detector housing 11 comprises a cold finger 22, a base 23 for electrical connection, a cover support 24 and a cover 25.

The infrared detector 16 is a CFPA (Cooled Focal Plane Array) detector constituted by a matrix of pixels sensitive to infrared radiation. The infrared detector 16 has a detection face of general planar shape, for receiving infrared radiation coming from the target, and having an optical axis X perpendicular to the detection face and centred relative to the latter.

The infrared detector 16 is attached electrically to contact studs 26 of the intermediate cup 19 by means of wired cabling.

The base 23 is made of dielectric material, such as glass, in which electrical pins 27 are embedded for collecting electric signals coming from the infrared detector 16 to the processing module 5.

The cover 25 is mounted on the cover support 24. The cover 25 comprises a body 28, a viewing window 29, a tip 31 and a protective cap 32.

The body 28 has a viewing opening 33 and a suction opening 34. The window 29 closes the viewing opening 33 and is made of material transparent to infrared radiation, for example germanium. The tip 31 has a first end attached to the suction opening 34 and a second end for being attached to a suction device to create a partial vacuum ($10^{-6}$ bars) inside the first cavity 21. The protective cap 32 blocks the second end to keep the vacuum created in the first cavity 21.

The cold finger 22 has an elongated cylindrical part 35 extending inside the base 23 and an attachment part 36.

The cylindrical part 35 is intended to contain the heat exchanger of the cooling machine. For this reason, the cylindrical part 35 comprises a thin cylindrical sidewall enclosing the heat exchanger of the cooling machine. The wall is closed at one end by the plug 18 which is in contact with the substrate 17 supporting the infrared detector 16 to ensure cooling of the detector 16.

The attachment part 36 is adapted to contain the cylinder of the cooling machine. The attachment part 36 comprises a thick cylindrical sidewall, enclosing the cylinder of the cooling machine, and a crown 37 extending around the cylindrical wall, in a radial plane relative to the cylindrical wall. The crown 37 has a support surface 38 for bearing on the cooling machine housing 12.

The cold finger 22, the base 23 for electrical connection, the cover support 24 and the cover 25 are welded to each other, for example by laser welding, so as to seal the first cavity 21.

The cold-production part 8 comprises a cooling machine 39 (partially shown) and a cooling machine housing 12 for accommodating the cooling machine 39. The cooling machine housing 12 defines a second cavity 41 containing the cooling machine 39, the second cavity 41 being filled with cooling gas such as helium (He). The cooling machine 39 operates according to a cyclic Stirling process for cooling the cooling gas. For this reason, the cooling machine 39 comprises a cylinder 42, a piston 43 for sliding in the cylinder and a heat exchanger 44. The heat exchanger 44 comprises a stack of cooling fins 45 and a regenerative tube 46 containing the stack.

The cooling machine housing 12 has an opening 47 for receiving the attachment part 36 of the cold finger 22, and a collar 48 enclosing the opening 47. The collar 48 has a cylindrical outer threaded surface 49.

Also, the collar 48 has a shoulder 51 in which a sealing joint 52 is disposed. The sealing joint 52 is a joint having a transversal C-shaped cross-section.

The cooling machine housing 12 also has cooling fins 53 for cooling gas by thermal exchange with ambient air.

The motorisation part 9 comprises an electric motor (not shown) and a motor housing 54 for accommodating the electric motor. The electric motor is for driving the piston 43 of the cooling machine. The motor housing 54 has power pins 55 for connecting the electric motor to a power source.

The detection module 4 also includes a fastening device 56 for fixing the detector housing 11 onto the cooling machine housing 12. The fastening device 56 comprises a nut 57 enclosing the detector housing 11 and for being screwed onto the cooling machine housing 12.

The nut 57 is made in one single piece of material.

As is shown in FIG. 4, the nut 57 comprises a washer 58 for bearing against the crown 37 of the detector housing 11, and a ring 59 having a threaded inner surface 61 for cooperating with the threaded outer surface 49 of the cooling machine housing 12.

The fastening device 56 comprises an indexing pin 62 fixed to the cooling machine housing 12 and an indexing orifice 63 arranged in the detector housing 11. The indexing orifice 63 is provided to receive the indexing pin 62 so as to keep the detector housing 11 in position relative to the cooling machine housing 12 during screwing of the nut 57. With the detection unit 4 being fixed in the case 2 of the binoculars 1 by the cooling machine housing 12, the indexing pin 62 and the indexing orifice 63 produce correct angular orientation of the detector 16 in the binoculars 1.

During manufacture of the detection part 7, the nut 57 is first threaded onto the cold finger 22 before the cold finger 22 is welded to the base 23. In this way, once welding is complete, the nut 57 is inseparable from the detector housing 11.

The detection part 7 and the cold-production part 8 are assembled as follows.

The attachment part 36 of the cold finger 22 is inserted in the cooling machine housing 12 via the opening 47 until the detector housing 11 bears against the cooling machine housing 12, more precisely, until the crown 37 bears against the collar 48. At the same time the heat exchanger 44 of the cooling machine 39 is inserted into the cylindrical part 36 of the cold finger 22.

The detection housing 11 is positioned relative to the cooling machine housing 12 such that the indexing pin 62 enters the indexing orifice 63, ensuring correct relative positioning between the two housings 11 and 12.

Once the detection housing 11 is correctly positioned relative to the cooling machine housing 12, the nut 57 is screwed onto the cooling machine housing 12. The nut 57 is screwed around a screwing axis combined with the optical axis X.

The effect of screwing the nut 57 is both to secure the housings 11 and 12 together and also to compress the sealing joint 52 between the two housings 11 and 12. In fact, the washer 58 of the nut 57 presses the sealing joint 52 against the shoulder 51, by means of the crown 37. This produces homogeneous compression of the sealing joint 52.

In this way, fastening the housings 11 and 12 together requires just a single screwing operation.

Figure 6A:
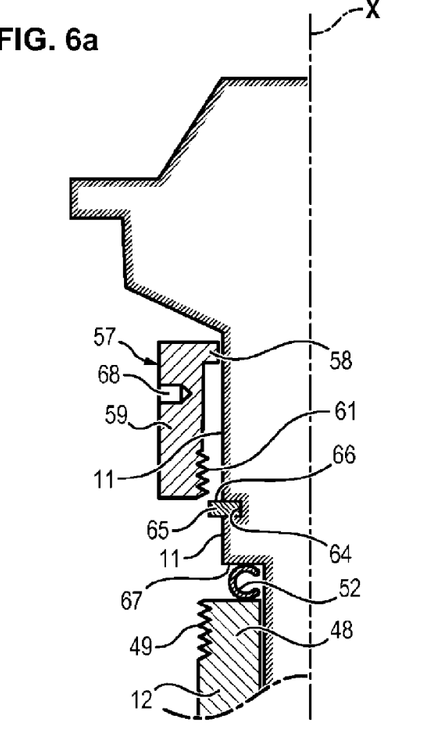
Figure 6B:
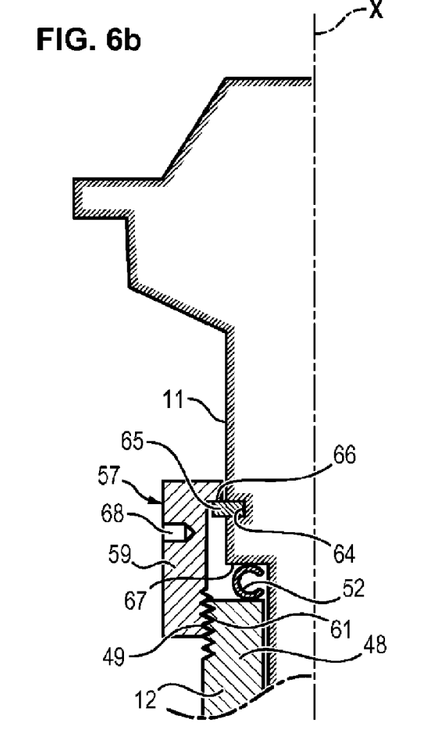

For easier assembly operations, it is possible to keep the detection housing 11 against the cooling machine housing 12, for example by means of a press to ensure correct relative positioning between the two housings during screwing of the nut 57. FIGS. 6a and 6b schematically illustrate fastening of the housings 11 and 12 according to a second embodiment.

This second embodiment is identical to the first embodiment, except that the detector housing 11 has no crown 37. Instead, the detector housing 11 comprises a groove 64 formed in the cylindrical sidewall of the detector housing 11, and an elastic ring 65 (or circlip) received in the groove 64. The elastic ring 65 can be inserted into the groove 64 by means of circlip pliers.

The elastic ring 65 has a support surface 66 on which the washer 58 of the nut 57 bears to press the detector housing 11 against the cooling machine housing 12.

The detector housing 11 further comprises a shoulder 67 in which the sealing joint 52 is arranged.

The nut 57 also comprises an orifice 68 for insertion a pin of a pin spanner which can be used for screwing the nut 57.

The detection part 7 and the cold-production part 8 are assembled as follows.

The attachment part 36 of the cold finger 22 is inserted into the cooling machine housing 12 via the opening 47, such that the sealing joint 52 is captured between the detector housing 11 and the cooling machine housing 12 (FIG. 6a). More precisely, the sealing joint 52 is captured between the shoulder 67 of the detector housing 11 and the collar 48 of the cooling machine housing 12.

Once the detector housing 11 is correctly positioned relative to the cooling machine housing 12, the nut 57 is screwed onto the cooling machine housing 12 (FIG. 6b), for example by means of a pin spanner. The nut 57 is screwed around a screwing axis combined with the optical axis X.

The effect of screwing the nut 57 is both to secure the housings 11 and 12 together and also to compress the sealing joint 52 between the two housings 11 and 12. In fact, the washer 58 of the nut 57 presses the sealing joint 52 against the collar 48, by means of the elastic ring 65.

As in the first embodiment, fastening the housings 11 and 12 together needs only a single screwing operation.

Also, an advantage of this second embodiment is that the nut 57 can be detached, i.e., it can be separated from the housings 11 and 12. For this reason the elastic ring 65 simply has to be withdrawn. This makes for easier handling of the detection module (4) during manufacture.

Figure 7A:
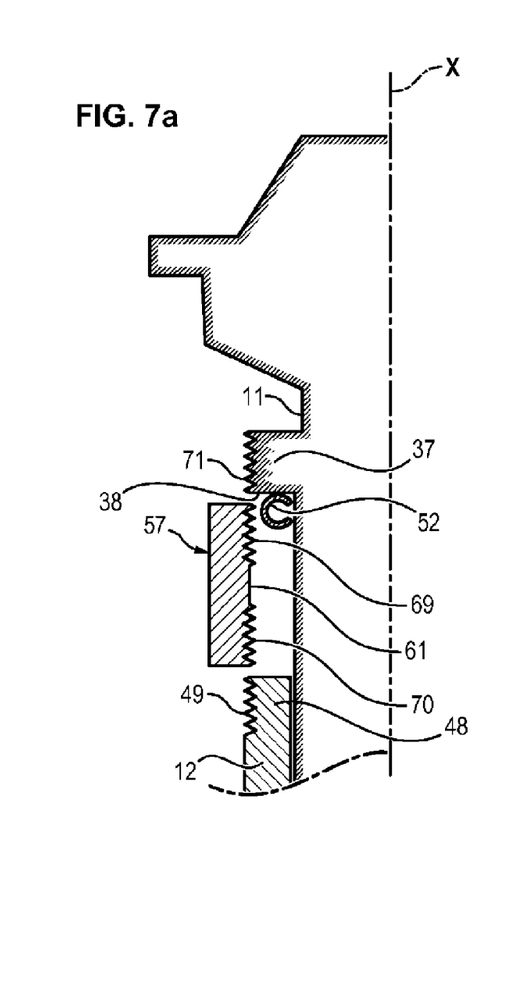
Figure 7B:
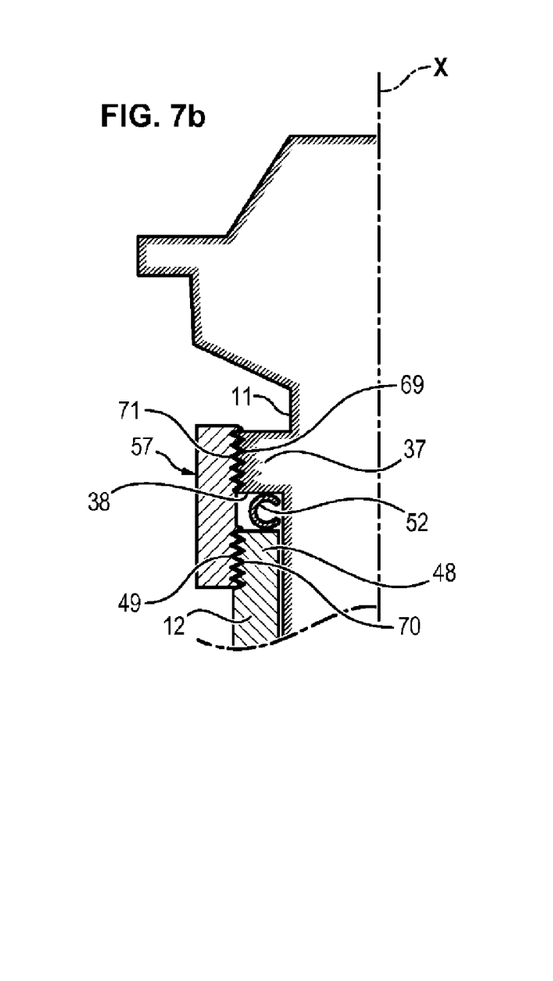

FIGS. 7a and 7b schematically illustrate fastening of the housings 11 and 12 according to a third embodiment.

This third embodiment is identical to the first embodiment, except that the nut 57 has no washer 58.

But the nut 57 comprises an inner surface 61 having a first threaded portion 69 and a second threaded portion 70. The first threaded portion 69 has a first pitch and the second threaded portion 70 has a second pitch, reversed relative to the first pitch.

The detector housing 11 has a threaded outer surface 71 for cooperating with the first threaded portion 69 of the nut 57. More precisely, the threaded outer surface 71 is an outer surface of the crown 37.

The cooling machine housing 12 has a threaded outer surface 49 for cooperating with the second threaded portion 70 of the nut 57.

As the threaded portions present reversed pitches, the nut 57 can be screwed simultaneously onto the detector housing 11 and the cooling machine housing 12 in a single screwing operation.

The effect of screwing of the nut on the housing 11 and 12 is to compress the sealing joint 52 between the housings 11 and 12.

In the third embodiment, the nut 57 is detachable by simple unscrewing of the nut, which makes for easier handling of the detection module during its manufacture.

The invention claimed is:

1. Infrared detection module comprising:
   a detection part comprising an infrared detector and a detector housing for accommodating the infrared detector,
   a cold-production part comprising a cooling machine for cooling the detector and a cooling machine housing for accommodating the cooling machine, a fastening device for fixing the detector housing on the cooling machine housing, the fastening device comprising a nut for being screwed onto the detector housing and/or onto the cooling machine housing so as to secure the housings together, and an indexing pin fixed to one of the housings and an indexing orifice arranged in the other housing, the indexing orifice configured to receive the indexing pin to prevent rotation of the housings relative to each other caused by screwing of the nut.

2. The module according to claim 1, wherein the detector housing comprises a cold finger having an elongated cylindrical part intended to contain a heat exchanger of the cooling machine.

3. The module according to claim 1, comprising a sealing joint arranged between the detector housing and the cooling machine housing, and wherein the effect of screwing the nut is to compress the sealing joint between the detector housing and the cooling machine housing.

4. The module according to claim 3, wherein the sealing joint is a joint having a transversal C-shaped cross-section.

5. The module according to claim 1, wherein the nut comprises a washer for bearing against a support surface of the detector housing, and a threaded inner surface for cooperating with a threaded outer surface of the cooling machine housing, the effect of screwing the nut onto the cooling machine housing being to clamp the detector housing against the cooling machine housing by means of the washer.

6. The module according to claim 5, wherein the detector housing comprises a crown, the support surface being a surface of the crown.

7. The module according to claim 5, wherein the detector housing comprises a groove and an elastic ring received in the groove, the support surface being a surface of the elastic ring.

8. The module according to claim 1, wherein the nut comprises an inner surface having a first threaded portion for cooperating with a threaded outer surface of the detector housing and a second threaded portion for cooperating with a threaded outer surface of the cooling machine housing.

9. The module according to claim 8, wherein the first threaded portion has a first pitch and the second threaded portion has a second pitch, reversed relative to the first pitch.

10. The module according to claim 1, wherein the nut encloses the detector housing and/or the cooling machine housing.

11. Infrared detection module comprising:
a detection part comprising an infrared detector and a detector housing for accommodating the infrared detector, a cold-production part comprising a cooling machine for cooling the detector and a cooling machine housing for accommodating the cooling machine, a fastening device for fixing the detector housing on the cooling machine housing, the fastening device comprising a nut for being screwed onto the detector housing and/or onto the cooling machine housing so as to secure the housings together, wherein the detector housing comprises:

a first part defining a cavity accommodating the infrared detector, and a second part for being inserted in the cooling machine housing, wherein the nut has been mounted on the second part prior to welding of the first part onto the second part, such that once the two parts are welded, the nut is inseparable from the detector housing.

12. The module according to claim 1, wherein the detector has an optical axis, and the nut is for being screwed onto the detector housing and/or onto the cooling machine housing around a screwing axis combined with the optical axis.

13. Infrared vision equipment, comprising a detection module according to claim 1.

14. The equipment according to claim 13, the equipment being infrared vision binoculars.

* * * * *